United States Patent [19]

Hefele

[11] Patent Number: 5,153,064

[45] Date of Patent: Oct. 6, 1992

[54] HOT-MELT ADHESIVE SUBSTANCE FOR THE RASTER-PATTERN COATING OF FABRICS, ESPECIALLY OF LINING MATERIALS

[75] Inventor: Josef Hefele, Gräfelfing, Fed. Rep. of Germany

[73] Assignee: Kufner Textilwerke GmbH, Munich, Fed. Rep. of Germany

[21] Appl. No.: 698,727

[22] Filed: May 10, 1991

[30] Foreign Application Priority Data

Oct. 16, 1990 [EP] European Pat. Off. ........... 90119839

[51] Int. Cl.$^5$ ..................... B32B 7/12; B32B 27/04
[52] U.S. Cl. ................................. 428/355; 428/343; 428/346; 428/200; 428/198; 524/277; 524/487; 524/488; 524/489; 528/295.3; 528/302; 528/308.1; 528/308.7
[58] Field of Search ............... 428/343, 355, 346, 198, 428/200; 524/277, 487, 488, 489; 528/295.3, 302, 308.1, 308.7

[56] References Cited

U.S. PATENT DOCUMENTS

| | | | |
|---|---|---|---|
| 3,657,389 | 4/1972 | Caldwell et al. | 260/873 |
| 4,146,586 | 3/1979 | McConnell et al. | 260/873 |
| 4,155,952 | 5/1979 | McConnell et al. | 260/873 |
| 4,183,978 | 1/1980 | Hefele | 427/202 |
| 4,204,017 | 5/1980 | Hefele | 428/160 |
| 4,217,426 | 8/1980 | McConnell et al. | 525/173 |
| 4,554,303 | 11/1985 | Petke et al. | 524/277 |

FOREIGN PATENT DOCUMENTS 2081279 2/1982 United Kingdom .

Primary Examiner—George F. Lesmes
Assistant Examiner—D. R. Zirker
Attorney, Agent, or Firm—Scully, Scott, Murphy & Presser

[57] ABSTRACT

The invention describes a hot-melt adhesive substance for the coating of fabrics, especially of lining materials of outer wear, comprising a hot-melt adhesive paste on a copolyester basis as the base layer and a covering layer of a hot-melt adhesive. The inventive hot-melt adhesive substance is characterized in that the hot-melt adhesive paste of the base layer contains a mixture of copolyester and low-pressure polyethylene. The covering layer of hot-melt adhesive preferably contains co-polyamide. When using the inventive hot-melt adhesive substance, a raster-pattern coated fabric can be obtained in which the hot-melt adhesive substance has substantially improved adhesive strength as well as a high degree of washing and cleaning stability.

9 Claims, 1 Drawing Sheet

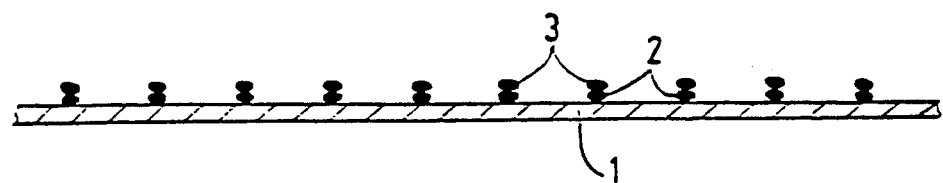

HOT-MELT ADHESIVE SUBSTANCE FOR THE RASTER-PATTERN COATING OF FABRICS, ESPECIALLY OF LINING MATERIALS

This invention concerns a hot-melt adhesive substance for the raster-pattern coating of fabrics, e.g. of textiles, papers, leather, foam materials or plastic films. In particular, the invention concerns a hot-melt adhesive substance for the raster-pattern coating of fixable lining materials for the clothing industry.

Hot-melt adhesive substances are known, a base layer of which is preferably applied in raster-pattern in the form of an aqueous paste on a fabric to be coated. A hot-melt adhesive powder is then diffused on it. The fabric is then caused to vibrate by a fast-rotating beater roller. The surplus of hot-melt adhesive powder is blown off and extracted, and the powder which adheres on the raster-pattern imprint is dried and sintered together with the aqueous-pasty substance of the base layer. The sintered product constitutes the hot-melt adhesive substance. The coating raster which is preferably punctiform therefore consists of the base layer of the dried and sintered hot-melt adhesive paste, on which the sintered hot-melt adhesive diffusion powder is applied as a second layer. The coated fabrics are laminated in sheet form or as cuttings with other sheet-type or cut fabrics under the influence of pressure and at comparatively mild temperature to form cleaning-resistant composite materials with especially high washing resistance and adhesion. Numerous hot-melt adhesive substances are known which have cleaning-resistant properties for the screen printing process. They are Primarily composed of aqueous-pasty mixtures of hot-melt adhesive fine powders, which can also be applied in a somewhat coarser particle form by themselves directly for coating in the diffusion or gravure printing process (the powder dot process . The cleaning-resistant hot-melt adhesive substances which are mostly used today are based on copolyamides, copolyesters or low-pressure polyethylenes. Equally polyurethanes have been suggested and used for this purpose. Other hot-melt adhesive substances which are also used are not resistant to cleaning.

For the pasting of the hot-melt adhesive fine powder for the production of the base layer, special suspension or dispersion agents are used which provide the pastings with clean printing capacity, but without reducing the resistance to cleaning. In addition, the dispersion agents should cause other special property features, e.g. the prevention of sedimentation of the powder which is mixed in, sharp-contour formation of the print, controlled penetration of the hot-melt adhesive paste, prevention of penetration through the outerfabric, avoidance of a reaction during fixation or the elimination of edge-welding, when cutting the fabrics. Such dispersion agents have been described e.g. in Patents DE-B 2 007 971, DE-B-2 229 308, DE-B-2 407 505, DE-B-2 577 504 and DE-B-3 510 109. Softeners can be added to the dispersing agents. Frequently additives are employed of high molecular polyethylene oxide, which increases the flexibility of the paste.

For raster-pattern coating in the screen printing process, screen stencils are employed which have perforations in a regular or irregular arrangement, through which the hot-melt adhesive substances are imprinted using an inner doctor on the lining fabric. Whereas previously screen stencils with comparatively large spacing and big apertures were used, more recently ever finer coatings have been carried out with closer juxtaposition of smaller apertures, forming small hot-melt adhesive dots which are closer together. In addition, the lining materials have become lighter, finer and necessarily more dense, to obtain clean printing. Whereas earlier lining coatings were conventional in an 11 to 17 mesh raster with 11 to 17 dots/inch in a linear arrangement, today linings with 38 dots per inch in linear arrangement are already in use. With the refinement of the raster, the range of Problems of coating has grown, and simultaneously the cleaning problems have increased, because the coarser raster arrangement with the larger individual dots produces a better adhesion strength than the finer raster arrangement with smaller individual dots.

However, the use of lining materials has undergone gradual change. For reasons of fashion and also for environmental reasons, more and more lining materials are used in articles of clothing which are preferably washed rather than cleaned, e.g. linings for leisure clothing.

This change in trend has led to the result that the copolyamide hot-melt adhesive substances which were previously used exclusively for the outer wear articles have been more and more replaced by copolyester hot-melt adhesive substances, because while it is true that copolyesters do not have the especially good chemical cleaning resistance of the copolyamides, they possess better washing stability. The use of the low-pressure polyethylenes which are adequately resistant to chemical cleaning and are very good in washing-resistance is excluded for the outer wear confections of today, because low-pressure Polyethylene melts too high at a melting point of about 130° C. and therefore fixing gap temperatures of about 150° C. and more are necessary. The fixing gap temperatures which are used today in practice are always lower between the lining and the top cloth. Low-pressure polyethylenes are therefore restricted today almost exclusively to shirt linings. The change in the production and use of linings has also led finally, for cost and quality reasons, to the fact that the coating amount, which is applied Per $m^2$ of lining material, has been clearly reduced. Whereas previously add-on amounts of 18 to 25 $g/m^2$ were normal, today for lining materials they range between 8 and 18 $g/m^2$ By reducing the add-on amount, the industry which produced such lining materials could meet the need for a softer and more flowing drape of the fixed zones of the clothing.

In order to solve the problems with respect to reduced washing and cleaning stability as well as the weaker adhesive strength, improved hot-melt adhesive substances as well as improved coating technologies and improved coating carriers have been developed. The so-called duo coating, in which every coating dot consists of two layers, as mentioned above, has been particularly satisfactory. Such a duo coating is described e.g. in the patents DE-B-2 214 236, DE-B-2 231 723, DE-B-2 536 911 and DE-B-3 230 579. Most recently, an indirect coating method has been introduced in which the coating is firstly applied on a sub-carrier and is then transferred from it onto the lining sheet. Such a coating process is described e.g. in European patents EP-A-0 219 376 and EP-A-0 365 711.

The coating carriers have been improved by the use of finer yarns with fine-titered individual fibers ranging up to the micro-fiber range as well as synthetic yarns, e.g. high bulk acryl yarns and crimped polyester yarns. Furthermore, the fabrics originally used have been increasingly replaced by other fabrics, e.g. by woven knitted goods or by woven and knitted fleeces, wherein these last named substances constitute a combination of fleeces with woven knitted goods and with knitted goods. But despite this progress, not all the requirements, particularly of the clothing industry, could be met. Especially the stiffening as well as increased creasing tendency of a fixing compound of lining and outerfabric, particularly for fine raster coatings, is seen as a continuing defect. But very specially it is regarded as negative that in the case of finely coated lining materials on fine outerfabrics, e.g. those for blouses, the washing stability of the fixing compound is only moderate and frequently even defective, despite the use of copolyesters. There is therefore a continuing substantial need for a lining which can be ironed at the mild fixing temperatures which are used today with lower coating weight, which conveys a soft fixation feel, is washable without any problems and maintains after the laundering process a high adhesive strength.

Until now it has not been possible to provide such a lining. One can approximate e.g. to the existing requirement by the use of improved hot-melt adhesive substances which provide the desired high adhesive strength, which also remains after washing or cleaning, with a substantially reduced coating weight.

Therefore the invention is based on the object of making available a hot-melt adhesive substance with a hot-melt adhesive paste on a copolyester basis as the base layer and a covering layer of a hot-melt adhesive, which has a high adhesive strength as well as outstanding washing and cleaning resistance with a reduced amount of coating. In addition the costs for the production of a fixation compound should be substantially reduced thereby.

This problem is solved by a hot-melt adhesive substance of the type named initially, wherein according to the invention, the hot-melt adhesive paste of the base layer contains a mixture of copolyester and low-pressure polyethylene.

Advantageous further developments and embodiments of the inventive hot-melt adhesive substance are the subject of the subclaims. The inventive hot-melt adhesive substance is particularly suitable for the production of raster-pattern coatings of fabrics, especially for coating lining materials for outer wear. Inventively, furthermore, a lining material is made available which is provided with the hot-melt adhesive substance and has a high degree of adhesive strength, even after washing.

In the hot-melt adhesive paste of the base layer, the weight ratio of copolyester to low-pressure polyethylene is preferably in the range from 2:1 to 2:3, based on the dry weight of the hot-melt adhesive paste. This paste is preferably an aqueous-pasty mixture of the named components. In this case, the evaporable content which consists primarily of water is in the range from 48 to 68%, based on the undried hot-melt adhesive substance.

This substance is applied preferably in accordance with the invention on the article to be coated, e.g. on a lining material for clothing, so that initially the hot-melt adhesive paste is applied as a base layer in the screen printing process. Thereupon an upper or covering layer is applied. In particular a hot-melt adhesive powder which is diffused is suitable as the covering layer. After diffusion, the lining material is caused to vibrate, and subsequently the powder which does not adhere to the base layer is removed.

After a conventional drying and sintering process, the raster pattern coated fabrics are fixed by pressure and temperature influence with other fabrics to form a cleaning-resistant compound, the latter having a high washing and cleaning stability. Compared with a raster coating of similar type with a hot-melt paste which contains exclusively copolyester as the hot-melt adhesive powder, with the same amount of hot-melt adhesive after washing, more than double the adhesive strength and after chemical cleaning about twice to four times the adhesive strength can be achieved. The same increase is obtained after fixation.

The hot melt adhesive is illustrated in the drawing. Therein, a substrate, e.g. a lining material, supports a coating made up of a base layer 2 and a covering layer 3.

These adhesion increasing properties are remarkable to the extent that they already appear at fixing gap temperatures which are substantially below those which are necessary when using low-pressure polyethylene. Because of the improved adhesive strength it is possible in particular to reduce the necessary coating amount, in order thereby to achieve a softer, less creaseliable and less stiff feel and drape of the fixing compound. The coating amount which is necessary in general in the case of the inventive hot-melt adhesive substance composed of the dried and sintered base layer and the covering layer sintered on it is in the range from 6 to 15 g/m$^2$. By using the essentially more economic low-pressure polyethylene and by reducing the amount of coating, the prime costs for such linings can also be substantially reduced. The adhesive strength for chemical cleaning is not relatively influenced by the use of low-Pressure polyethylenes.

The low-pressure polyethylene contained in the hot-melt adhesive paste is a powder having a particle size of maximally about 80 $\mu$m and a melting point or melting range between 122° and 137° C. The melt index which is measured at a temperature of 190° C. and a pressure impact of 21.6 N stamping pressure in accordance with DIN 53 735, is between 5 and 30 g/10 min. outflow time. To characterize the copolyesters, which are used for the hot-melt adhesive pastes, the information concerning melting point is less suitable. On gradual heating, the copolyesters show maxima and minima of the heat absorption energy. The maximum energy absorption in the melting range measured with a thermo analyzer in accordance with the Mettler system TA 3000, with which a temperature increase of 10° C./min. was carried out, should be between 105° and 135° C., preferably between 110 and 125° C. for the copolyester used in the invention. The melt index of the copolyester used, which was measured at a temperature of 160° C. and a pressure of 21.6 N stamping pressure, amounts to 5 to 50 g/10 min. outflow time, preferably between 10 and 40 g/10 min. outflow time. The particle size is also below 80 $\mu$m.

For pasting the mixture of copolyester and low-pressure polyethylene, dispersing agents are used. For this purpose compositions are suitable which are used for pasty hot-melt adhesive substances on the copolyamide basis. As examples, those are named which have been described in the above-mentioned patents, DE-B-2 007 971, DE-B-2 229 308, DE-B-2 407 505 and DE-B-3 510 109, to which reference is made expresses verbis. Particularly suitable are dispersing agents with a thickening agent based on polyacrylic or polymethacrylic acid, which are to be used in the wet hot-melt adhesive paste in a share from 0.5 to 2.0% by weight, based on the weight of the wet hot-melt adhesive paste. Polyvinyl pyrrolidon, cellulose glycolic acid or other thickeners are also suitable. In addition, carboxylic acids, preferably aliphatic mono-carboxylic acids, fatty acids, waxy acids or also lactic acids can be used, which should partially be present as salts. The acids preferably have from 15 to 25 carbon atoms. The share is also between 0.5 to 2.0% by weight based on the weight of the wet hot-melt adhesive paste. The salt formation is performed for preference with ammonia, the pH of the hot-melt adhesive paste being between 7.0 and 10.0. As additional thickening agents, water-soluble cellulose derivates, e.g. hydroxy ethyl cellulose, can also be included in an amount from 0.05 to 0.3% by weight. The paste may also contain softeners in an amount of up to about 6% by weight based on the wet hot melt adhesive paste, e.g. o- or p-toluenesulfonamide or N-alkylated toluenesulfonamide. Moreover a small amount of high molecular polyethylene oxide can be added. The dry share of the hot-melt adhesive paste amounts preferably to 32 to 52 by weight.

The covering layer of the inventive hot-melt adhesive paste contains preferably a copolyamide, copolyester or mixtures thereof. It is especially preferable, as was found surprisingly, to use copolyamide. Preferably the covering layer is diffused on the base layer, the material of the covering layer being a powder. The copolyamide powder has predominantly a particle range from 80 to 200 μm. Products on the market can be used as the powders for the covering layer. When diffusing copolyesters, it may be advantageous to treat the powder before diffusion with a wetting agent in an amount of 0.1 to 1.0% by weight, in order to obtain an even powder distribution, certain removal of the powder surplus as well as a further increase in adhesive value. Suitable wetting agents are non-ionogenic wetting agents, e.g. polyglycol ether, such as alkyl polyglycol ether or alkyl aryl polyglycol ether. Expediently the wetting agent used is dissolved in a solvent, e.g. alcohol (methyl-, ethyl-or isopropyl alcohol) and is then mixed in a fast mixer with the powder. After drying in air, the powder thus obtained can be used for diffusion. It is also possible, to use powders which have been modified before production or thereafter with softeners. In the case of the double-layered coating of hot-melt adhesive paste and powder, the weight ratio of hot-melt adhesive dry paste to hot-melt adhesive powder is about 1:1.

The powder preferably has a maximum thermal energy absorption in the melting range at a temperature between 90° and 110° C., when measured with a thermo analyzer using the Mettler system TA 3000 with temperature increase of 10° C./min. The melt index both when using copolyester powder as well as copolyamide powder should be at 20 to 60 g/10 min. outflow time, preferably at 30 to 50 g/10 min. outflow time, when measured at a temperature of 160° C. and at a pressure of 21.6 N stamping pressure.

The inventive hot-melt adhesive substance will be explained in more detail below, with reference to the following examples.

The hot-melt adhesive pastes which are used as the base layer are prepared as follows:

The following components are mixed together in vacuum (0.1 bar):

50 parts by weight initial dispersion A
130 parts by weight water
50 parts by weight copolyester powder I or II
50 parts by weight low-pressure polyethylene powder
3.0 parts by weight Hoechst thickener V 3748
(30% polyacrylic acid derivative dispersion, produced by Hoechst)

The initial dispersion A always has the following composition:

1350 parts by weight water
2 parts by weight concentrated ammonia, density 0.91 g/cm$^3$
125 parts by weight stearin (65% stearic acid, 35% palmitic acid)
120 parts by weight Latecoll AS ® (10% solution of polyacryl acidic ammonium, ammonia-alkaline, pH = 11, producer: BASF, Ludwigshafen)
4 parts by weight Natrosol HR 250 ® (hydroxy-ethyl-cellulose, producer: Hercules)

EXAMPLE 1

To prepare a first paste (B1), the following copolyester (I) is used:

Copolyester (I): Platherm M 1400 ®,
particle size 0 to 80 μm
melt index (160° C., 21.6 N): 34 g/10 min.
melt range: 100 to 127° C.
heat absorption peak by the Mettler system TA 3000: 124.8° C.
bulk density: 60.6 g/100 cm$^3$
producer: Atochem, Bonn The low-pressure polyethylene used for preparation of the paste (B1) is defined as follows:

LP-polyethylene: Abifor 1300 ®
particle size 0 to 80 μm
melt index (190° C., 21.6 N): 20 g/10 min.
melting point: 130° C.
heat absorption peak by the Mettler system TA 3000: 129° C.
bulk density: 38 g/100 cm$^3$
producer: Billeter, Zurich, CH The hot-melt adhesive paste (B1), which has a solid content of 37%, is stirred shortly before the coating process. The viscous hot-melt adhesive paste is doctored through the perforations of a 25 mesh film screen with regular arrangement of dots on a coating carrier with a slightly inclined doctor. The diameter of the perforations amounts to 0.3 mm, the wall thickness of the screen is 0.19 mm. The coating carrier is a textile with a weight of 35 g/m$^2$ and consists of a non-woven knitted fabric with a non-woven share of 30 g/m$^2$ of PES/PA fibers (30%/70%) with a fiber strength of 1.2 dtex. The non-woven fabric is dot-welded ,nd is knitted with PES multifilament warp yarns having a yarn strength of 44 dtex and a fiber strength of 1.5 dtex in the non-offset closed fringe binding. The fringe density in the transverse direction is 11/in. In the longitudinal direction 10 meshes per inch. The add-on amount of the hot-melt adhesive paste is 13 g/m$^2$ wet paste; this corresponds to an amount of 5 g/m$^2$ dry paste.

Directly after printing, the coating of the base layer is diffused with a covering layer of hot-melt adhesive powder. The diffused powder is a copolyester defined as follows:

| Copolyster (III): | Avabond 30 E ®<br>particle size: 80 to 200 μm<br>melt index (160° C., 21.6 N): 46 g/10 min.<br>melt range: 100 to 120° C.<br>heat absorption peak by the Mettler systen TA 3000: 105° C.<br>bulk density: 63.6 g/100 cm³<br>producer: Avalon Chemical |
|---|---|

After diffusion of the base layer with the diffusion powder, the non-woven fabric is caused to vibrate by a fast rotating beater. The diffused powder which does not adhere to the print points is removed by blowing and extraction. Subsequently drying is performed at 140° C. and attempts were made to detect the adhesive strength with this hot-melt adhesive coated non-woven material. The results are shown in the table.

EXAMPLE 2

To produce the hot-melt adhesive paste (B2), a co-polyester (II) was used defined as follows:

| Copolyester (II) | Griltex 6 P ®<br>particle size 0 to 80 μm<br>melt index (160° C., 21.6 N): 14 g/10 min.<br>melt range: 110 to 130° C.<br>heat absorption peak by the Mettler systen TA 3000: 125.8° C.<br>bulk density: 65 g/100 ccm<br>producer: Ems Chemie, Domat/Ems |
|---|---|

The low-pressure polyethylene used to prepare the hot-melt adhesive paste corresponds to that in example 1.

The application of this hot-melt adhesive paste was done in the same way as in example 1. The copolyester (III) indicated in example 1 was used as the hot-melt adhesive diffusion powder.

The coatings produced by the inventive hot-melt adhesive substance as in example 2 were examined for adhesive strength. The results are shown in the table.

EXAMPLE 3

The same hot-melt adhesive paste (B1) as in example 1 was used. But instead of the hot-melt adhesive powder of example 1, this time a copolyamide (IV) was used defined as follows:

| Copolyamide (IV): | Griltex D 1302 ®<br>particle size 80 to 200 μm<br>melt index (160° C., 21.6 N): 36 g/10 min.<br>melt range: 98 to 124° C.<br>heat absorption peak by the Mettler systen TA 3000: 100° C.<br>bulk density: 57.5 g/100 cm³<br>producer: Ems Chemie, Domat/Ems |
|---|---|

The hot-melt adhesive paste and the diffusion powder were applied in the same way as in example 1.

The coatings produced with the hot-melt adhesive substance of example 3 were examined for adhesive strength. The results are given in the table.

EXAMPLE 4

The hot-melt adhesive past (B2) described in example 2 was used as the base layer. The hot-melt adhesive powder used to prepare the covering layer was the copolyamide (IV) used in example 3. The coating was performed as in example 1.

The coating prepared with the inventive hot-melt adhesive substance as in example 4 was examined for adhesive strength. The results are shown in the table.

COMPARATIVE EXAMPLES 1 TO 3

The hot-melt adhesive pastes (B3), (B4) and (B5) shown below were imprinted on a coating carrier, without hot-melt adhesive powder being used on this occasion as the covering layer. A 25 mesh film screen with a hole diameter of 0.4 mm and a wall thickness of 0.19 mm was used. The add-on amount of the hot-melt adhesive substance was respectively about 10 g/m² dry substance. The hot-melt adhesive substances used for comparative examples 1 to 3 had the following composition:

```
50   parts by weight initial dispersion (A)
100  parts by weight water
100  parts by weight copolyester powder (I), (II)
     (V)
1.5  parts by weight Hoechst thickener V 34748 ®
     (30% polyacrylic acid derivative
     dispersion, producer: Hoechst)
```

The following copolyester powders were used for the individual comparative examples 1, 2 and 3:

| Comparative example 1:<br>Copolyester (I), cf.<br>example 1 | |
|---|---|
| Comparative example 2:<br>Copolyester (II), cf.<br>example 2 | |
| Comparative example 3:<br>Copolyester (V): | Avabond 30 E ®<br>particle size: 0 to 80 um<br>(different granulation from Avabond 30 E ® having a particle size of 80 to 200 um; the other properties as well as the supplier are identical with those for copolyester (III) as in example 1) |

The coatings produced with the hot-melt adhesive substances as in examples 1 to 3 were examined for adhesive strength. The results are shown in the table.

To judge the adhesive strength, the coated textile carriers, which were all coated with a hot-melt adhesive amount of about 10 g/m², were applied and fixed on a cotton-poplin surface (117 g/m², warp and weft density respectively 280/10 cm). The fixation was carried out by board pressing. The fixation data of the coating carrier with the hot-melt adhesive substances as in examples 1 to 4 were as follows:

| Top board temperature: | 145° C. |
|---|---|
| bottom board temperature: | 100° C. |
| fixing gap temperature: | 128° C. |
| pressure: | 300 cN/cm² |

-continued

| fixing time: | 15 s |
|---|---|

The fixation data for a coating carrier with hot-melt adhesive substances as in comparative examples 1 to 3 were as follows:

| Top board temperature: | 155° C. |
|---|---|
| bottom board temperature: | 100° C. |
| fixing gap temperature: | 138° C. |
| pressure: | 300 cN/cm$^2$ |
| fixing time: | 15 s |

TABLE

Adhesion values at 10 g/m$^2$ add-on weight, expressed in cN/5 cm$^2$

| Sample from | after fixing | after washing 60° C. | after chemical cleaning |
|---|---|---|---|
| example 1 | 3200 | 850 | 1700 |
| example 2 | 2350 | 850 | 1200 |
| example 3 | >4000 | 1750 | >4000 |
| example 4 | >4000 | 1600 | >4000 |
| comp. ex. 1 | 650 | 450 | 1000 |
| comp. ex. 2 | 750 | 450 | 900 |
| comp. ex. 3 | 600 | 450 | 1100 |

The measured adhesive values show that the inventive double-layered coating as in examples 1 to 4 are far superior to the simple hot-melt adhesive paste coatings as in comparative examples 1 to 3, which are based solely on copolyesters. Surprisingly, especially outstanding results are obtained when a hot-melt adhesive substance is used with a base layer containing a mixture of copolyester and low-pressure polyethylene and a covering layer of a hot-melt adhesive powder of copolyamide (cf. examples 3 and 4).

I claim:

1. A hot-melt adhesive comprising a base layer which includes a copolyester hot melting adhesive covering layer disposed over said base layer wherein said base layer comprises a mixture of said copolyester characterized by a particle size of less than 80 μm and melt index in the range of from 5 to 50 g/10 min. outflow time at a temperature of 160° C. and a pressure of 21.6 N and a polyethylene having a particle size of no more than 80 μm, a melting point in the range of from 122° C. to 137° C. and a melt index in the range of from 5 to 30 g/10 min. outflow time at a temperature of 190° C. and a pressure of 21.6 N.

2. A hot-melt adhesive in accordance with claim 1 wherein said copolyester and said polyethylene are present in a weight ratio of from 2:1 to 2:3, based on the dry weight of said copolyester and said polyethylene respectively.

3. A hot-melt adhesive in accordance with claim 2 wherein the base layer is an aqueous mixture of said copolyester and said polyethylene.

4. A hot-melt adhesive in accordance with claim 3 wherein the base layer includes a dispersion agent selected from the group consisting of polyacrylic acid, polymethacrylic acid, polyvinyl pyrrolidone, cellulose glycolic acid, carboxylic acids, fatty acids, waxy acids, lactic acid and salts thereof.

5. A hot-melt adhesive in accordance with claim 4 wherein said base layer includes free aliphatic monocarboxylic acids having 14 to 25 carbon atoms or salts thereof.

6. A hot-melt adhesive in accordance with claim 5 wherein the base layer includes a softener present in an amount of up to about 6% by weight, based on the weight of the wet base layer.

7. A hot-melt adhesive in accordance with claim 6, wherein the softener is selected from the group consisting of o-toluenesulfonamide, p-toluenesulfonamide and an N-alkylated toluenesulfonamide.

8. A hot-melt adhesive in accordance with claim 1 wherein the covering layer comprises a copolyester, a copolyamide or mixtures thereof.

9. A hot-melt adhesive in accordance with claim 1 wherein the weight ratio of said base layer on a dry basis to said covering layer is about 1:1.

* * * * *